United States Patent
Wang et al.

(10) Patent No.: US 6,900,388 B2
(45) Date of Patent: May 31, 2005

(54) PERSONAL DIGITAL ASSISTANT WITH STATIC ELECTRICITY PREVENTING FUNCTION

(75) Inventors: Shih-Chieh Wang, Taipei (TW); Yen-Te Chiang, Taipei (TW); Chien-Lung Huang, Taipei (TW); James Tseng, Shulin (TW); Chu-Yang Hsu, Hsinchu (TW); Hsi-Hsing Hsu, Taoyuan (TW)

(73) Assignee: High Tech Computer, Corp., Taoyuan (TW)

( * ) Notice: Subject to any disclaimer, the term of this patent is extended or adjusted under 35 U.S.C. 154(b) by 554 days.

(21) Appl. No.: 10/050,156

(22) Filed: Jan. 18, 2002

(65) Prior Publication Data

US 2003/0041202 A1 Feb. 27, 2003

(30) Foreign Application Priority Data

Jul. 25, 2001 (TW) ........................................ 90118247 A

(51) Int. Cl.$^7$ ................................................. G06F 1/16
(52) U.S. Cl. ........................ 174/52.1; 361/683; 361/753
(58) Field of Search ............................. 174/52.1, 35 R, 174/35 GC; 361/681, 683, 686, 753, 752, 816, 818; 312/223.1, 223.2; 345/156

(56) References Cited

U.S. PATENT DOCUMENTS

| | | | |
|---|---|---|---|
| 6,388,870 B1 * | 5/2002 | Canova et al. | 361/683 |
| 6,388,877 B1 * | 5/2002 | Canova et al. | 361/686 |
| 6,466,299 B1 * | 10/2002 | Lehtiniemi et al. | 349/199 |
| 6,624,432 B1 * | 9/2003 | Gabower et al. | 250/515.1 |
| 2002/0166682 A1 * | 11/2002 | Watchko et al. | 174/35 R |

FOREIGN PATENT DOCUMENTS

JP  09-092399  4/1997

\* cited by examiner

*Primary Examiner*—Dean A. Reichard
*Assistant Examiner*—Carmelo Oliva
(74) *Attorney, Agent, or Firm*—Rabin & Berdo, P.C.

(57) ABSTRACT

A personal digital assistant with static electricity preventing function, comprising: a metallic or electroplated chassis installed in the personal digital assistant serving as the grounding for the personal digital assistant; a touch panel module installed on the chassis; and a metallic shielding piece installed on the touch panel module and is equipped with a grounding section on the side, of which, the grounding section is connected to the chassis dispersing electrostatic charges, meanwhile, fixes the touch panel module firmly to the chassis.

9 Claims, 2 Drawing Sheets

PERSONAL DIGITAL ASSISTANT WITH STATIC ELECTRICITY PREVENTING FUNCTION

This application incorporates by reference Taiwanese application Serial No. 90118247, Filed on Jul. 25, 2001.

BACKGROUND OF THE INVENTION

1. Field of the Invention

The invention relates in general to a personal digital assistant (PDA), and more particularly to a personal digital assistant with static electricity preventing function.

2. Description of the Related Art

Static electricity originates from the contact and separation between two objects. When the two objects come into contact with each other, electrons will shift from one object to the other. When the two objects separate from each other, the object with electrons departing away will carry positive charge whereas the electron-receiving object will carry negative charge. A tiny amount of electrons, say, as small as a few hundred thousandth of the total amount, shifting from one object to the other would suffice to produce a significant electrostatic effect. Normally, the drier the environment is, the easier the electrostatic phenomenon becomes consequently. Electrostatic discharge (ESD) effect means the discharge effect caused by the ionization of gas around the electric field formed by the object with positive charge. Discharge phenomenon is due to dielectric breakdown, which occurs as long as the strength of electric filed formed by a charged body reaches the critical level of dielectric breakdown. By means of grounding and bonding, the easiest but most effective way to prevent electrostatic discharge, the charges generated will be channeled and dispersed immediately. If there are more than two objects carrying static electricity, the potential difference between them can be reduced if they are connected via a conductor and are grounded. As a consequence, the discharge effect between different objects can be avoided.

In recent years the electronic industry is booming around the world, and the market demand for portable electronic appliances such as notebook computers, mobile phones, personal digital assistants etc. is mounting. Meanwhile, due to the improvement in living standard, people nowadays tend to have air conditioning equipment installed both in their workplaces and homes as well to lower the humidity such that a more comfortable living environment can be attained. However, a dry environment makes it difficult to eradicate static electricity. The semi-conductor components inside electronic products such as personal digital assistants are apt to be influenced by static electricity, causing damage to the product itself. A conventional personal digital assistant can bear up to 10 KV of electrostatic discharges. Therefore, how to strengthen the static electricity preventing function of electronic products so as to prevent them from being afflicted by electrostatic discharges has become a problem of immediate concern for engineers.

SUMMARY OF THE INVENTION

It is therefore an object of the invention to provide a personal digital assistant with better static electricity preventing ability, which can bear up to approximately 20 KV of electrostatic discharges.

Such a personal digital assistant with static electricity preventing function comprises: a metallic or an electroplated chassis installed in the personal digital assistant serving as the grounding and frame for the personal digital assistant; a touch panel module installed on the chassis; and a metallic shielding piece, which is installed on the touch panel module and is equipped with a grounding section on the side, of which, the grounding section is connected to the chassis dispersing electrostatic charges, meanwhile, fixes the touch panel module firmly to the chassis.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
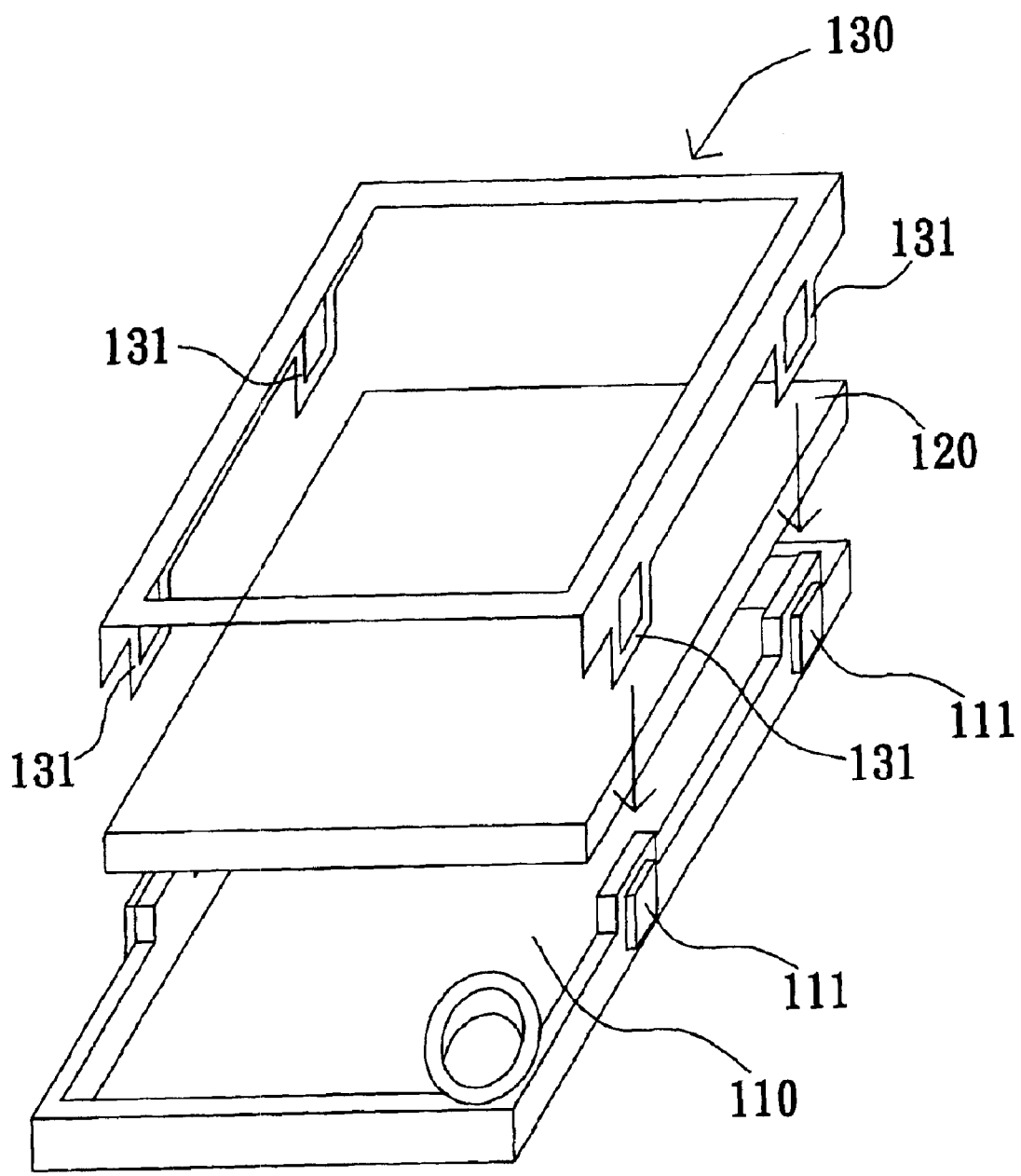
FIG. 1 shows a schematic diagram of a personal digital assistant according to a preferred embodiment of the invention.

Please refer to FIG. 1 a schematic diagram of a personal digital assistant according to a preferred embodiment of the invention. Such a personal digital assistant with electrostatic electricity preventing function comprises: a metallic or an electroplated chassis 110 installed in the personal digital assistant serving as the grounding and frame for the personal digital assistant; a touch panel module 120 installed on the chassis 110; and a metallic shielding piece 130 installed on the touch panel module and is equipped with a grounding section 131 on the side, of which, the grounding section clicks into a locator 111 during assembly not only disperses electrostatic charges but also fixes the touch panel module 120 firmly to the chassis 110. When the personal digital assistant comes into contact with objects from outside carrying high charges, the metallic shielding piece 130 will immediately channel overloaded charges to the chassis 110, preventing the semi-conductor components inside from being damaged because of electrostatic charges.

Figure 2:
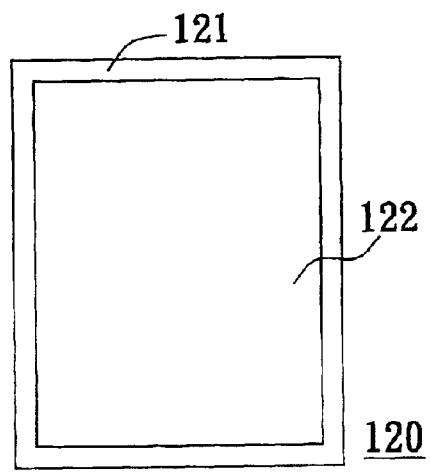
FIG. 2 shows a top view of the touch panel module 120 in FIG. 1.

Please refer to FIG. 2, a top view of the touch panel module 120 in FIG. 1. The touch panel module 120 comprises a printed circuit area 121 and a touch area 122, wherein the printed circuit area 121 encompasses the touch area 122. When the assembly of the personal digital assistant is finished, the metallic shielding piece 130 will press on and be fixed to the printed circuit area 121, while the touch area 122, having no contact with the metallic shielding piece 130, holds the touch panel module 120 firmly by means of a click joint between the grounding section 131 and the locator 111.

Figure 3A:
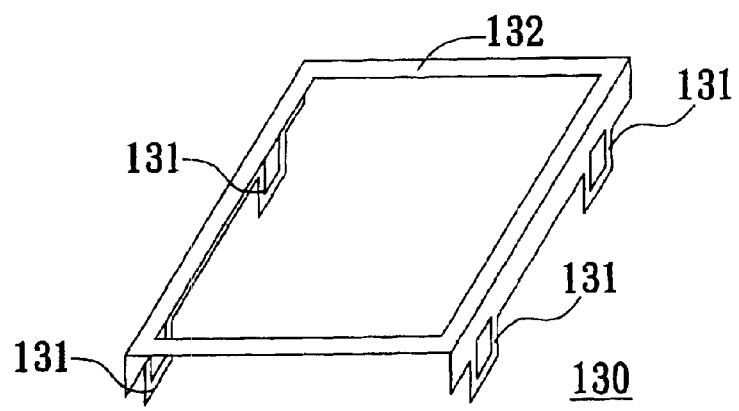
FIG. 3A shows a front view of the metallic shielding piece 130 in FIG. 1.
Figure 3B:
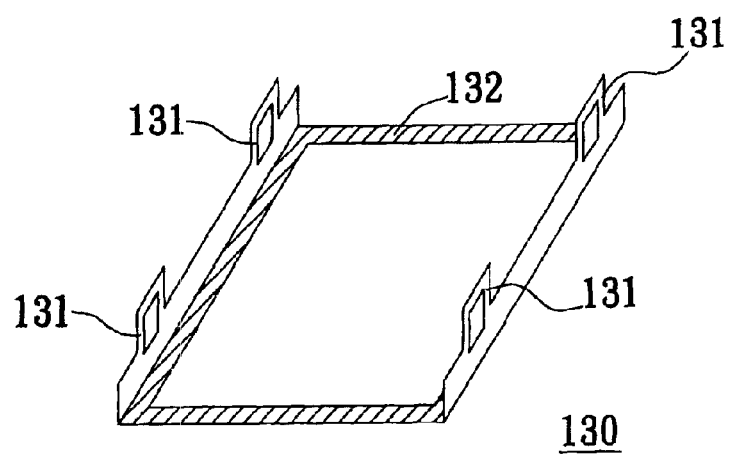
FIG. 3B shows a rear view of the metallic shielding piece 130 in FIG. 1.

Next, please refer to FIGS. 3A and 3B, a front view and a rear view of the metallic shielding piece 130 in FIG. 1. As shown in the diagram, the metallic shielding piece 130 comprises a grounding section 131 and a pressure-fixing section 132, wherein the grounding section 131 clicks into the locator 111 and channels overloaded charges to the chassis 110 while the pressure-fixing section is roughly of the same shape and size as that of the printed circuit area 121. When the assembly of the personal digital assistant is completed, the rear of the pressure-fixing section 132 will press on and be fixed to the printed circuit area 121. The rear of the pressure-fixing section 132 (marked in slash lines in FIG. 3B) needs the treatment of lacquer coating so that short circuits of the touch panel module 120 can be avoided.

The personal digital assistant with static electricity preventing function as disclosed in the preferred embodiment according to the invention is able to channel overloaded electrostatic charges originating from the environment to a chassis via a metallic shielding piece, enhancing the static electricity preventing ability greatly. A conventional personal digital assistant can only bear up to approximately 10 KV of electrostatic discharge, whereas the personal digital assistant according to the invention has been proved to be able to bear up to 20 KV of electrostatic discharge, responding to challenges and needs better than the former.

While the invention has been described by way of example and in terms of the preferred embodiment, it is to be understood that the invention is not limited to the disclosed embodiment. Therefore, the scope of protection of the invention is defined in the appended claims; and it is to be understood that invention is intended to cover various modifications and similar arrangements and procedures, and the scope of the appended claims therefore should be accorded the broadest interpretation so as to encompass all such modifications and similar arrangements and procedures.

What is claimed is:

1. A personal digital assistant with static electricity preventing function, comprising:

a chassis installed in the personal digital assistant serving as the grounding for the personal digital assistant, the chassis comprising a locator protruding from a side thereof;

a touch panel module installed on the chassis; and a metallic shielding piece which is installed on the touch panel module, presses the touch panel module and comprises a grounding section formed on a side thereof, wherein the grounding section clicks into the locator of the chassis to cause the metallic shielding piece to be in electrical contact with the chassis and the touch panel module to be fixed to the chassis firmly.

2. The personal digital assistant according to claim 1, wherein the chassis is a metallic chassis.

3. The personal digital assistant according to claim 1, wherein the chassis is an electroplated chassis.

4. The personal digital assistant according to claim 1, wherein the touch panel module comprises a touch area and a printed circuit area to, the printed circuit area encompassing the touch area and being in contact with the metallic shielding piece.

5. The personal digital assistant according to claim 4, wherein the metallic shielding piece further comprises a pressure-fixing section for pressing on the printed circuit area of the touch panel module, the grounding section of the metallic shielding piece being dependent from the pressure-fixing section.

6. The personal digital assistant according to claim 5, wherein the pressure-fixing section is insulation-treated.

7. The personal digital assistant according to claim 6, wherein the pressure-fixing section is treated with lacquer coating.

8. The personal digital assistant according to claim 7, wherein the pressure-fixing section is substantially of the same shape and size as that of the printed circuit area.

9. The personal digital assistant according to claim 1, wherein the personal digital assistant is adapted to bear up to 20 KV of electrostatic discharge.

* * * * *